United States Patent [19]

Millonig et al.

[11] Patent Number: 5,431,415
[45] Date of Patent: Jul. 11, 1995

[54] SEAL WITH ACUTE HEEL ANGLE

[75] Inventors: Hans F. Millonig, Lansdale; Vinay Nilkanth, Souderton, both of Pa.

[73] Assignee: Greene Tweed of Delaware, Inc., Kulpsville, Pa.

[21] Appl. No.: 152,765

[22] Filed: Nov. 15, 1993

[51] Int. Cl.6 .......................... F16J 15/32; F16J 15/48
[52] U.S. Cl. ..................................... 277/205; 277/177
[58] Field of Search ............... 277/165, 168, 173, 174, 277/177, 205, 206 R, 212 C

[56] References Cited

U.S. PATENT DOCUMENTS

| | | | |
|---|---|---|---|
| 2,686,402 | 8/1954 | Samuel | 277/205 |
| 2,914,369 | 11/1959 | Hayman | 309/34 |
| 3,123,367 | 3/1964 | Brummer et al. | 277/205 |
| 3,377,076 | 4/1968 | Burnett | 277/177 |
| 4,268,045 | 5/1981 | Traub | 277/121 |
| 4,342,463 | 8/1982 | Burke | 277/177 |
| 4,417,503 | 11/1983 | Izumi | 277/205 X |
| 4,421,330 | 12/1983 | Burke | 277/188 |
| 4,614,348 | 9/1986 | Fournier | 277/205 X |
| 4,723,782 | 2/1988 | Müller | 277/205 X |
| 4,836,694 | 6/1989 | Schmehr et al. | 277/174 X |
| 4,893,823 | 1/1990 | Strouse et al. | 277/165 |
| 4,917,390 | 4/1990 | Lee et al. | 277/165 |
| 5,205,568 | 4/1993 | Stoll et al. | 277/205 |

FOREIGN PATENT DOCUMENTS

| | | | |
|---|---|---|---|
| 0063952 | 5/1980 | Japan | 277/205 |
| 0180166 | 10/1984 | Japan | 277/205 |

Primary Examiner—William A. Cuchlinski, Jr.
Assistant Examiner—John L. Beres
Attorney, Agent, or Firm—Panitch Schwarze Jacobs & Nadel

[57] ABSTRACT

A seal element for installation in an annular groove having a mouth, first and second radial surfaces, and an axial surface therebetween. The seal element has a first radial surface which forms an acute heel angle with the groove first radial surface, and the seal element forms an inner static area adjacent the groove axial surface and first radial surface. Upon installation of a rod and low pressure application, the seal element is compressed into the groove, and the seal element first radial surface is moved into contact with the groove first radial surface. Thus, the seal element prevents contamination from entering into the inner static area. The seal element has first and second angled surfaces forming a high pressure sealing line and third and fourth angled surfaces forming a low pressure sealing line with a stress-relieving radius interconnecting the second and third angled surfaces. When the seal element is positioned in the groove, the angled surfaces face in the direction of and partially protrude through the groove mouth. The stress-relieving radius relieves excessive tensile stress, thereby alleviating the problem of cracking at the sealing face and premature seal failure. Moreover, the stress-relieving radius provides better flexing motion to the low pressure sealing lip, thereby avoiding high compressive stress and reducing the compressive set on the low pressure sealing lip.

12 Claims, 3 Drawing Sheets

SEAL WITH ACUTE HEEL ANGLE

BACKGROUND OF THE INVENTION

The present invention relates generally to seal assemblies for effecting a seal between relatively movable parts and, more particularly, to an improved single-element seal assembly that prevents contamination from entering into the inner static area on the static side of the seal assembly.

Single-element seal assemblies, particularly for use in providing a seal between relatively movable or reciprocating surfaces such as pistons and surrounding cylinders and/or piston rods and surrounding housings, are generally well known in the art. The seal element is usually but not always formed from a relatively resilient, deformable sealing material, such as synthetic or natural rubber, and is generally annular. Typically, the seal element is installed in an annular sealing groove or gland within one of the reciprocating surfaces with the groove opening facing the other surface. Such single-seal elements are designed to seal both during low pressure operation, i.e. below a predetermined pressure limit, and during high pressure operation, i.e. at or above the predetermined pressure limit. In general, the pressure limit determines the specific material used to form the seal element.

While such a seal assembly generally provides effective sealing at both low and high pressures, the prior art seal element, due to its structure, tends to force or "pump" contaminants into the sealing groove behind the seal element and into an inner static area between the seal element and the surface of the sealing groove. Eventually, the accumulation of contaminants causes undue wear on the seal element within the groove and tends to force the seal element to move away from the back surface of the seal groove resulting in leakage on the static side of the seal element. As a result of such static side leakage, the seal is eventually compromised. The prior art seal element also has a disadvantage in that it tends to crack and break apart at the sealing face due to stress concentrations.

The present invention comprises an improved single-element seal assembly in which the seal element prevents contamination from entering into the inner static area between the seal element and the surface of the groove to maintain good sealing contact on the static side and to prevent undue wear of the seal element. Also, the improved seal element is designed to resist cracking and breaking apart at the sealing face.

SUMMARY OF THE INVENTION

Briefly stated, the present invention comprises a seal element for installation in an annular groove having a mouth, first and second parallel radial surfaces, and a generally axial surface interconnecting the first and second radial surfaces. The seal element has a generally annularly shaped body portion formed of an elastomeric material.

The body portion includes an axial surface for facing the axial surface of the groove and a first radial surface for facing the first radial surface of the groove. The first radial surface of the seal element has one end engaging one end of the axial surface of the seal element to form a heel portion. A first generally angled surface has one end engaging the other end of the first radial surface of the seal element, and a second generally angled surface has one end engaging the other end of the first angled surface to form a high pressure sealing line. When the seal element is positioned in the groove, the first and second angled surfaces face in the direction of and partially protrude through the mouth of the groove.

When positioned within the groove, the first radial surface of the seal element forms an acute heel angle with respect to the first radial surface of the groove. Upon the application of pressure, the seal element forms an inner static area defined by the engagement of the axial surface of the seal with the axial surface of the groove and the engagement of the first radial surface of the seal with the first radial surface of the groove. As a result, the seal element prevents contamination from entering into the inner static area.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENT

Figure 1:
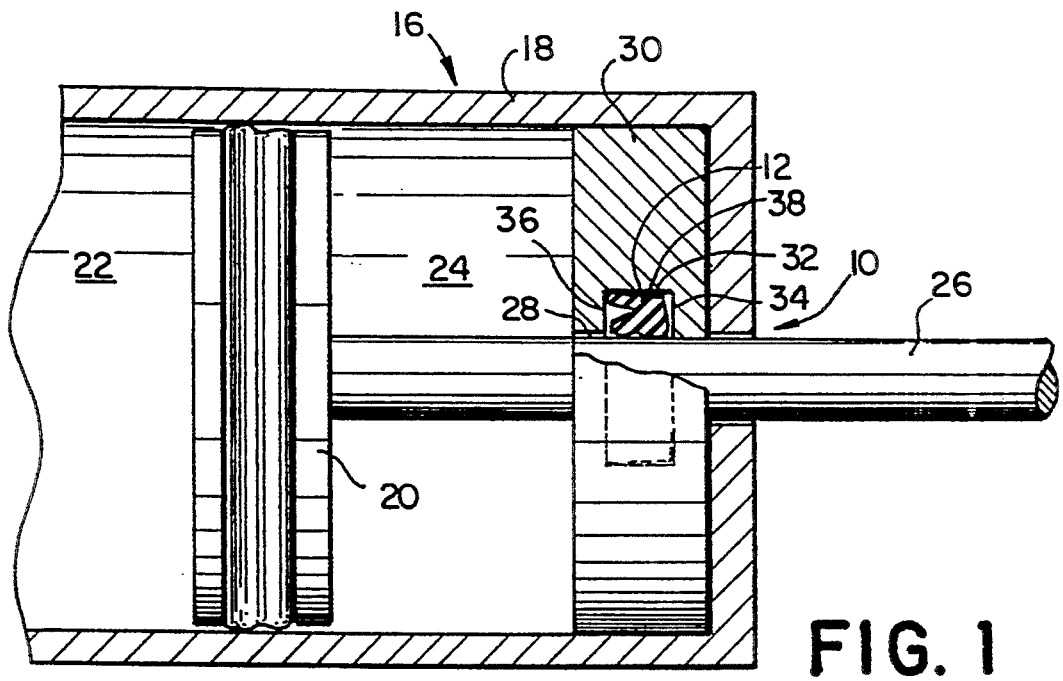
FIG. 1 is a sectional view of a piston and cylinder assembly illustrating uses of a preferred embodiment of the present invention.

Certain terminology may be used in the following description for convenience only and is not limiting. The words "right", "left", "upper" and "lower" designate directions in the drawings to which reference is made. The words "inwardly" and "outwardly" refer to directions toward and away from, respectively, the geometric center of the referenced element. The terminology includes the words above specifically mentioned, derivatives thereof, and words of similar import.

Referring to the drawings in detail, wherein like numerals are used to indicate like elements throughout, there is shown in FIG. 1 a preferred embodiment of a seal assembly 10 in accordance with the present invention. As will hereinafter be described in greater detail, the seal assembly 10 in the present embodiment comprises a single, generally annular seal element 12. It will be appreciated by those skilled in the art that the inventive concepts of the present invention is also applicable to seal assemblies containing more than one element. FIG. 1 illustrates just one of the various possible uses of a preferred embodiment of the seal assembly 10 in conjunction with a hydraulically actuated, generally cylindrical piston assembly 16. It will be appreciated that the seal assembly 10 as well as variations thereof which employ the inventive concepts of the present invention are equally useful in many other seal applications. The piston assembly 16 includes a cylinder 18 and a piston 20 housed within the cylinder 18 and movable reciprocally with respect to the cylinder 18. The piston 20 separates the cylinder 18 into two variable sized cylindrical chambers 22, 24. Attached to the piston 20 and extending through chamber 24 is a generally cylindrical piston rod 26. The piston rod 26 extends through a generally circular opening 28 on the closed end or head 30 of the cylinder 18. The cylinder head 30 includes a generally annular interior sealing groove or gland 32 which contains the seal assembly 10. As especially seen in FIGS. 1, 2A, and 3A, the sealing groove 32 has a first or outer radial surface 34 which is farther from chamber 24 and a second or inner radial surface 36 which is closer to chamber 24. An axial surface 38 interconnects radial surfaces 34 and 36. The sealing groove 32 is generally open and has a mouth 14 at a radially inner side and opposite the axial surface 38. Although not specifically shown in FIG. 1, a similar sealing groove and seal element may be used to provide a seal at the juncture of the piston 20 and the cylinder 18. However, the similar sealing groove would open on a radially outer side and the sealing assembly would require two sealing elements of the present invention to withstand high pressure from either chamber 22 or 24.

In general, both chambers 22 and 24 are filled with fluid, such as hydraulic fluid, and movement of the piston 20 and piston rod 26 is accomplished by varying the respective pressures within the chambers 22 and 24 through the introduction of and/or removal of pressurized fluid to/from one or the other of the chambers 22, 24. For example, the introduction of pressurized fluid into chamber 24 or the removal of pressurized fluid from chamber 22 results in the piston 20 moving toward the left, when viewing FIG. 1, to reduce the size of chamber 22 and to enlarge the size of chamber 24. Chamber 22 may include a spring (not shown) to provide a return force for moving the piston 20 toward the right, when viewing FIG. 1, when the pressure within chamber 24 has been reduced. Of course, the rod 26 correspondingly moves with the piston 20.

Figure 2A:
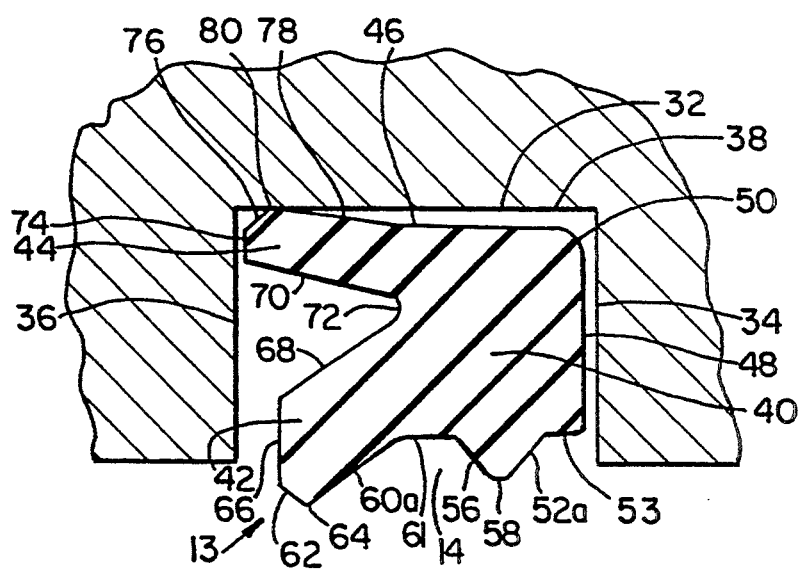
FIG. 2A is a sectional view of a prior art seal element within a sealing groove.
Figure 2B:
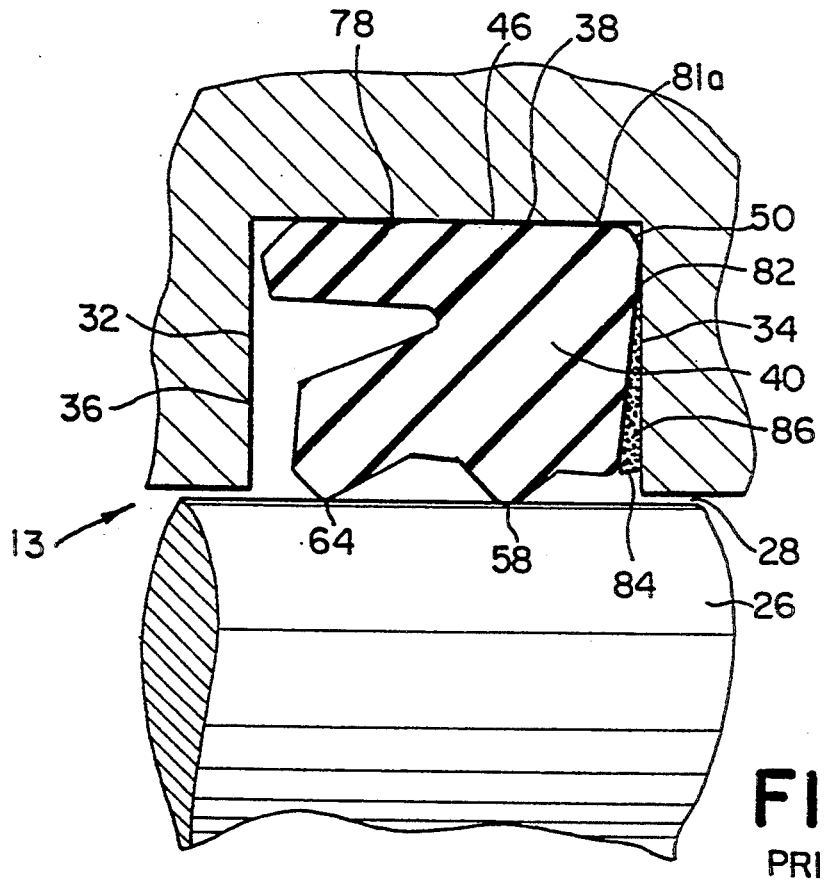
FIG. 2B shows the prior art seal element of FIG. 2A positioned within the sealing groove after installation of a piston rod and during low pressure operation.
Figure 2C:
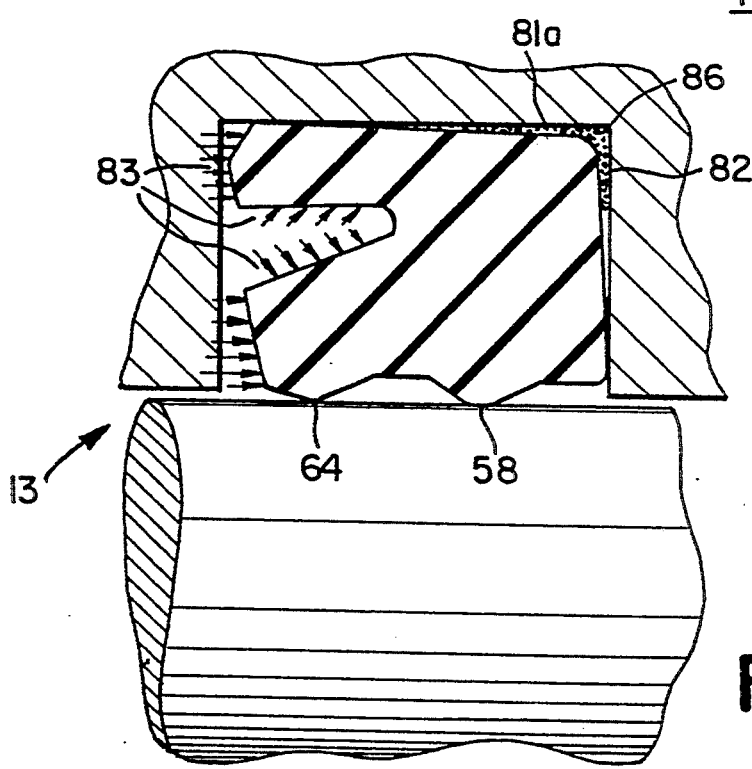
FIG. 2C shows the prior art seal element of FIG. 2B during high pressure operation.
Figure 3A:
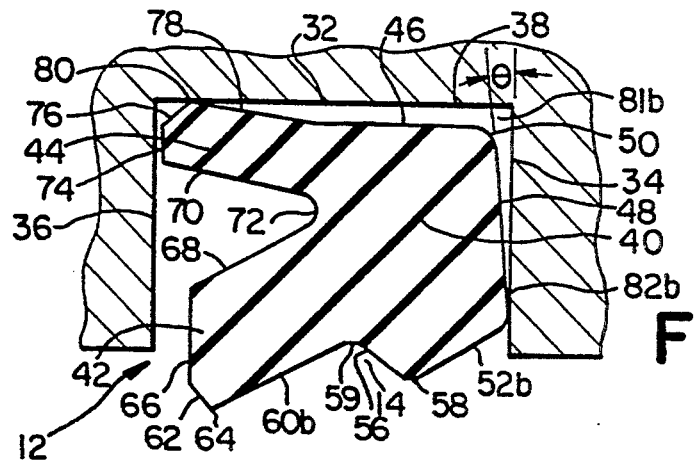
FIG. 3A is a sectional view of a preferred embodiment of a seal element in accordance with the present invention installed within a sealing groove.
Figure 3B:
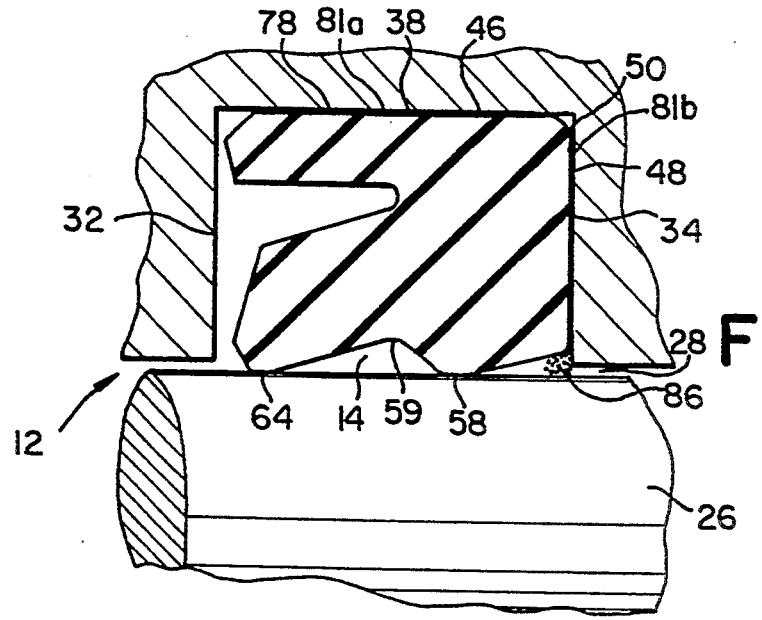
FIG. 3B shows the seal element of FIG. 3A positioned within the sealing groove after installation of a piston rod and during low pressure operation.
Figure 3C:
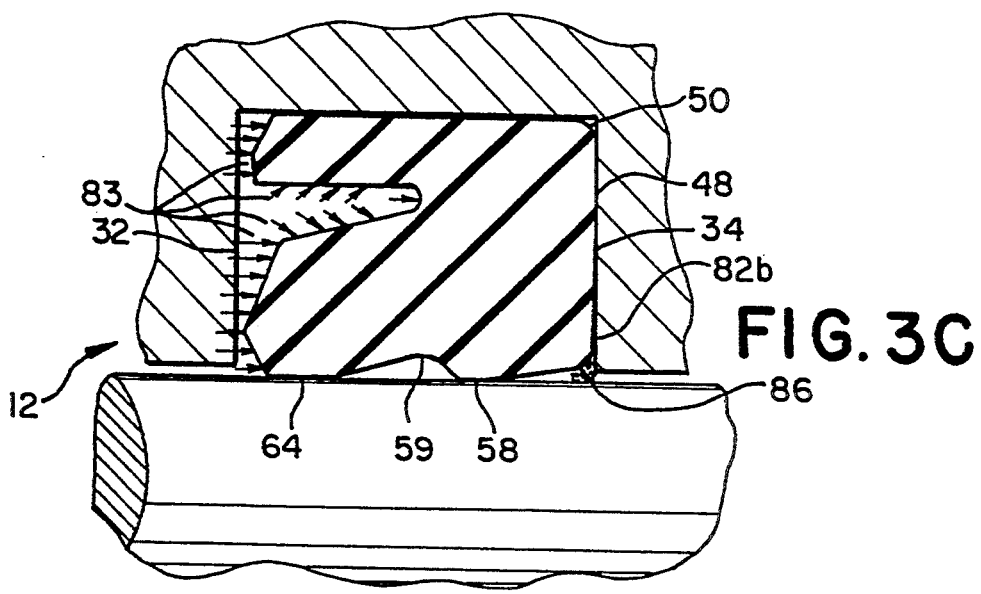
FIG. 3C shows the seal element of FIG. 3B during high pressure operation.

A typical prior art seal element 13 is shown in FIGS. 2A–2C, and the seal element 12 constructed in accordance with the present invention is shown in FIGS. 3A–3C. In describing the structure of the seal elements 12 and 13, the term "axial surface" shall mean a surface which extends generally parallel to the axis of the sealing elements and generally parallel to the direction of movement of the piston 20 and piston rod 26 (left and right when viewing FIGS. 2A–2C and 3A–3C) and the term "radial surface" shall mean a surface which extends generally perpendicular to the axis of the sealing elements and generally parallel to a radius of the sealing element (up and down when viewing FIGS. 2A–2C and 3A–3C). It should be noted that in FIGS. 2A and 3A the piston rod has not yet been installed in order to show the cross-sectional shape of the seal element 13 or 12, respectively, when initially installed within the sealing groove 32 and under a non-stress condition.

Both the prior art seal element 13 and the seal element 12 in accordance with the present invention are generally annular and are formed of an elastomeric material such as natural or synthetic rubber. Other appropriate sealing materials known or obvious to those skilled in the art may be used if desired. As seen in FIGS. 2A and 3A, the seal elements 12 and 13 are generally Y-shaped in cross-section, and include a body portion 40 and first and second leg portions 42, The body portion 40 of each of the seal elements 12 and 13 includes a generally axial surface 46 for facing the axial surface 38 of the groove 32. A first generally radial surface 48 has one end engaging one end of the axial surface 46 of the seal element 12 or 13 to form a heel portion 50. As shown in FIGS. 2A–3C, the first radial surface 48 faces the first radial surface 34 of the groove 32.

The prior art seal element 13, as seen in FIGS. 2A–2C, has a first angled surface 52a having one end which engages one end of a second generally axial surface 53 facing toward the mouth 14 of the groove 32. The other end of the second axial surface 53 engages the other end of the first radial surface 48. In contrast, and as seen in FIGS. 3A–3C, the seal element 12 of the present invention has a corresponding first generally angled surface 52b having one end which directly engages the other end of the first radial surface 48 of the seal element 12.

In either the seal element 12 of the present invention or the prior art seal element 13, a second generally angled surface 56 has one end engaging the other end of the first angled surface 52a or 52b to form a high pressure sealing line or lip 58. When the seal element 12 of the present invention is positioned in the groove 32, the first and second angled surfaces 52b and 56 face in the direction of and partially protrude through the mouth 14 and out of the groove 32. In the presently preferred embodiment of the seal element 12, the second angled surface 56 extends at an angle of approximately 120 degrees with respect to the first angled surface 52b. However, it will be appreciated by those skilled in the art that the second angled surface 56 may extend at some other angle, for example, an angle of between 100 degrees and 150 degrees.

The first leg portion 42 of the prior art seal element 13 includes a third generally angled surface 60a. As seen in FIGS. 2A–2C, in the present invention, one end of the angled surface 60a engages one end of a third generally axial surface 61, and the other end of the third axial surface 61 engages the other end of the second angled surface 56. In contrast, and as seen in FIGS. 3A–3C, the corresponding angled surface 60b has one end directly engaging the other end of the second angled surface 56 at a stress-relieving radius 59.

In either the seal element 12 of the present invention or the prior art seal element 13, a fourth generally angled surface 62 has one end which engages the other end of the third angled surface 60a or 60b to form a low pressure sealing line or lip 64. In the presently preferred embodiment of the seal element 12, the fourth angled surface 62 extends at an angle of approximately 120 degrees with respect to the third angled surface 60b. However, it will be appreciated by those skilled in the art that the fourth angled surface 62 may extend at some other angle, for example, an angle of between 100 degrees and 150 degrees. As with the first and second angled surfaces 52b and 56, the low pressure sealing lip 64 also faces in the direction of and partially protrudes through the mouth 14 and out of the groove 32.

The first leg portion 42 of each of the seal elements 12 and 13 also has a second generally radial surface 66 which has one end engaging the other end of the fourth angled surface 62, and a fifth generally angled surface 68 which has one end engaging the other end of the second radial surface 66. As shown in the drawings, the first leg portion 42, when inserted within the groove 32, extends from the body portion 40 generally in the direction of the second radial surface 36 of the groove 32.

The second leg portion 44 of each of the seal elements 12 and 13 includes a sixth generally angled surface 70 having one end engaging the other end of the fifth angled surface 68. The engagement of the fifth and sixth angled surfaces 68, 70 forms a generally inwardly rounded or radiused surface 72. Additionally, the second leg portion 44 includes a third generally radial surface 74 having one end engaging the other end of the sixth angled surface 70, a seventh generally angled surface 76 having one end engaging the other end of the third radial surface 74, and an eighth generally angled surface 78 having one end engaging the other end of the seventh angled surface 76 to form a sealing lip 80. The other end of the eighth angled surface 78 of the second leg portion 44 engages the other end of the axial surface 46 of the body portion 40. When the prior art seal element 13 or the seal element 12 of the present invention is initially positioned within the groove 32 as shown in FIGS. 2A or 3A, the sealing lip 80 abuts the axial surface 38 of the groove 32 at a sealing line proximate to the second radial surface 36 of the groove 32.

Both the prior art seal element 13 and the seal element 12 of the present invention are employed for the purpose of sealing the juncture of the piston rod 26 and the cylinder head 30 and eliminating a thin film of fluid which adheres to the piston rod 26 (as shown in FIG. 1) as the piston rod 26 is moved out of the cylinder 18. During low pressure operation (when the piston rod 26 is moving out of the cylinder 18), the low pressure sealing line or lip 64 engages the piston rod 26, as seen in FIGS. 2B and 3B. As also seen in FIGS. 2B and 3B, the high pressure sealing line or lip may also contact the piston rod during low pressure operation. During high pressure operation (when the chamber 24 is subjected to high pressure and the piston rod 26 is moving into the cylinder 18), the seal element 12 or 13 is compressed and deforms or moves so that the high pressure sealing line or lip 58 more firmly engages and seals the piston rod 26, as seen in FIGS. 2C and 3C.

Thus, during low pressure operation, the resilient nature of the low pressure sealing lip 64 maintains sufficient contact with the piston rod 26 and the sealing lip 80 maintains sufficient contact with the axial surface 38 of the groove 32 to effectively wipe or remove fluid from the piston rod 26 as it moves out of the cylinder 18 and to prevent fluid from escaping from the chamber 24. The high pressure sealing lip 58 may also help to maintain the effectiveness of the seal during low pressure operation.

The application of high pressure within chamber 24 typically causes a force, as shown by the arrows 83 in FIGS. 2C and 3C, to be applied to the seal element 12 or 13. As a result, the seal elements 12 or 13 are at least partially compressed into the sealing groove 32, resulting in an extension of the high pressure sealing lip 58 out from the groove 32 and into firm sealing contact with the piston rod 26. Along with the relative movements of the high and low pressure sealing lips 58, 64, the seal element 12 or 13 exhibits a deformation or movement in cross-section while alternating between low and high pressure operation.

As previously stated, the prior art seal element 13 has a disadvantage in that it tends to crack and break apart at the sealing face. Specifically, it has been discovered that the movement of the seal element 13 during repeated low and high pressure operations places undue tensile stress at the junctures of the first angled surface 52a and the second axial surface 53, the second angled surface 56 and the third axial surface 61, and the third angled surface 60a and the third axial surface 61. Thus, after relatively limited use, cracks appear at the areas of undue tensile stress, and the prior art seal element 13 prematurely fails. Moreover, it has been discovered that the third axial surface 61 causes higher compressive stresses that result in increased compression set on the low pressure sealing lip 64.

The seal element 12 of the present invention solves the problem of stress-related cracking at the aforementioned junctures by removing the second and third axial surfaces 53 and 61 from the prior art seal element 13. Thus, by having the first angled surface 52b directly engage the first radial surface 48 and by having the third angled surface 60b directly engage the second angled surface 56 at the stress-relieving radius 59, the excessive tensile stress experienced by the prior art seal element 12 is relieved, the problem of cracking is alleviated, and the seal element 12 of the present invention lasts longer than the prior art seal element 13. Moreover, the stress-relieving radius 59 provides better flexing motion to the low pressure sealing lip 64, thereby avoiding high compressive stress and reducing the compression set on the low pressure sealing lip 64.

With regard to the prior art seal element 13, and as particularly shown in FIG. 2B, when the piston rod is installed and low system pressure is present, the seal element 12 moves from the position shown in FIG. 2A to the position shown in FIG. 2B so that the axial surface 46 and the eighth angled surface 78 of the seal element 13 engage the axial surface 38 of the groove 32 to define an inner static seal area 81a on the static side of the seal element 13. Additionally, the body portion 40 abuts the first radial surface 34 of the groove 32 at a single point 82 proximate the heel portion 50. Consequently, an externally exposed generally angled gap 84 is created between the first radial surface 48 of the seal element 13 and the first radial surface 34 of the groove 32. During operation of the piston assembly 16, dirt, debris, oil, and other external contaminants 86 continually accumulate in the gap 84. As the prior art seal element 13 transitions between high and low pressure operation, the prior art seal element 13 rotates, as seen in FIGS. 2B and 2C, to close and open the gap 84. As the axial seal element surface 48 moves toward the axial surface 38 of the sealing groove 32, dirt, debris, and other contaminants 86 are forced into the inner static seal area 81a. As can be seen in FIGS. 2B and 2C, during repeated high and low pressure cycles the opening and closing of the gap 84 in the prior art seal element 13 moves or "pumps" the accumulated contaminants 86 into the inner static area 81a. With the pumping action of the prior art seal element 13, the inner static area 81a eventually fills with the contaminants 86. As a result, the contaminants 86 act to force the seal element 13 away from the groove thereby reducing the effectiveness of the seal formed on the static side of the seal element 13.

The seal element 12 of the present invention significantly reduces or eliminates the problem of seal contamination and corruption. When the seal element 12 is installed within the sealing groove 32 as shown in FIG. 3A, a heel angle $\theta$ is provided between the radial surface 34 of the sealing groove 32 and the radial surface 48 of the seal element 12. The vertex of the angle θ is a point 82b which may engage or may be adjacent to the radial surface 34 of the sealing groove 32 proximate to the mouth 14 of the groove 32. Preferably, the angle θ is acute and more preferably is between 2 degrees and 15 degrees.

When the piston rod 26 is installed and low system pressure is applied, the seal element 12 rotates in a clockwise direction when viewing FIG. 3A to close the angle θ and to the position shown in FIG. 3B. In this position, the eighth angled surface 78 and the axial surface 46 both engage the axial surface 38 of the sealing groove 32 to thereby provide an inner static seal area 81a in substantially the same manner as the prior art seal element 13. In addition, the first radial surface 48 of the seal element 12 engages the radial surface 34 of the sealing groove 32 along substantially its entire length to form a seal area 81b which effectively precludes contaminants 86 from moving into the area between the seal element 12 and the sealing groove 32. During high pressure operation, the seal element 12 is further compressed as shown in FIG. 3C to provide additional sealing pressure but the first radial surface 48 of the seal element 12 is maintained in continuous sealing engagement with the radial surface 34 of the sealing groove 32 along substantially its entire length. In this manner, contaminants 86 are continuously kept out of the sealing groove 32 during both high pressure and low pressure operation to maintain a high quality inner static seal 81a.

From the foregoing description, it can be seen that the present invention comprises an improved seal assembly formed from a single sealing element having a particular shape and contacting orientation. It will be recognized by those skilled in the art that changes may be made to the above-described embodiment of the invention without departing from the broad inventive concepts thereof. It is understood, therefore, that this invention is not limited to the particular embodiments disclosed, but is intended to cover all modifications which are within the scope and spirit of the appended claims.

We claim:

1. A seal element for installation in an annular groove having a mouth, first and second generally parallel radial surfaces, and a generally axial surface interconnecting the first and second radial surfaces, the seal element comprising a generally annular shape, formed of an elastomeric material, and having:

a body portion including a generally axial surface for facing the axial surface of the groove and a first generally radial surface for facing the first radial surface of the groove, the first radial surface of the seal element having one end engaging one end of the axial surface of the seal element to form a heel portion, a first generally angled surface having one end engaging the other end of the first radial surface of the seal element, and a second generally angled surface having one end engaging the other end of the first angled surface to form a high pressure sealing line, the first and second angled surfaces for facing in the direction of and partially protruding through the mouth of the groove;

the seal element being initially positioned within the groove such that the first radial surface of the seal element forms an initial acute heel angle with respect to the first radial surface of the groove;

the heel angle being substantially reduced to a minimal value when an annular opposing surface is positioned across the mouth of the groove to compress the seal element toward the axial surface of the groove and when the compressed seal element is unpressurized, the axial surface of the compressed seal element substantially contacting the axial surface of the groove, the first radial surface of the compressed seal element substantially contacting the first radial surface of the groove, and the high pressure sealing line of the compressed seal element contacting the opposing surface at a first squeeze level;

the high pressure sealing line of the compressed seal element contacting the opposing surface at a second squeeze level higher than the first squeeze level when the compressed seal element is pressurized, whereby rocking of the seal element against the first radial surface of the groove during multiple cycles of unpressurization and pressurization is minimized.

2. The seal element as recited in claim 1, wherein the initial heel angle is between about 2 and about 15 degrees.

3. The seal element as recited in claim 1 further comprising a first leg portion having a low pressure sealing line for protruding through the mouth of the groove.

4. The seal element as recited in claim 3, wherein the first leg portion comprises a third generally angled surface having one end engaging the other end of the second angled surface, a fourth generally angled surface having one end engaging the other end of the third angled surface to form the low pressure sealing line, the third and fourth angled surfaces for facing in the direction of and partially protruding through the mouth of the groove, a second generally radial surface having one end engaging the other end of the fourth angled surface, and a fifth generally angled surface having one end engaging the other end of the second radial surface of the seal element, the first leg portion for extending from the body portion generally in the direction of the second radial surface of the groove.

5. The seal element as recited in claim 3 further comprising a second leg portion having a sealing lip for abutting the axial surface of the groove at a point proximate to the second radial surface of the groove.

6. The seal element as recited in claim 5 wherein the second leg portion comprises a sixth generally angled surface having one end engaging the other end of the fifth angled surface to form a generally inwardly rounded surface, a third generally radial surface having one end engaging the other end of the sixth angled surface, a seventh generally angled surface having one end engaging the other end of the third radial surface, and an eighth generally angled surface having one end engaging the other end of the seventh angled surface to form the sealing lip, and the other end engaging the other end of the axial surface of the seal element, the second leg portion for extending from the body portion generally in the direction of the second radial surface of the groove.

7. A seal element for installation in an annular groove having a mouth, first and second generally parallel radial surfaces, and a generally axial surface interconnecting the first and second radial surfaces, the seal element comprising a generally annular shape, formed of an elastomeric material, and having:

a body portion including a generally axial surface for facing the axial surface of the groove, a first generally radial surface for facing the first radial surface of the groove, the first radial surface of the seal element having one end engaging one end of the axial surface of the seal element to form a heel portion, a first generally angled surface having one end engaging the other end of the first radial surface of the seal element, and a second generally angled surface having one end engaging the other end of the first angled surface to form a high pressure sealing line, the first and second angled surfaces for facing in the direction of and partially protruding through the mouth of the groove; and a first leg portion including a third generally angled surface having one end engaging the other end of the second angled surface, a fourth generally angled surface having one end engaging the other end of the third angled surface to form a low pressure sealing line, the third and fourth angled surfaces for facing in the direction of and partially protruding through the mouth of the groove, the first leg portion for extending generally in the direction of the second radial surface of the groove;

the seal element being initially positioned within the groove such that the first radial surface of the seal element forms an initial acute heel angle with respect to the first radial surface of the groove;

the heel angle being substantially reduced to a minimal value when an annular opposing surface is positioned across the mouth of the groove to compress the seal element toward the axial surface of the groove and when the compressed seal element is unpressurized, the axial surface of the compressed seal element substantially contacting the axial surface of the groove, the first radial surface of the compressed seal element substantially contacting the first radial surface of the groove, and the high pressure sealing line of the compressed seal element contacting the opposing surface at a first squeeze level;

the high pressure sealing line of the compressed seal element contacting the opposing surface at a second squeeze level higher than the first squeeze level when the compressed seal element is pressurized, whereby rocking of the seal element against the first radial surface of the groove during multiple cycles of unpressurization and pressurization is minimized.

8. The seal element as recited in claim 7, wherein the initial heel angle is between about 2 and about 15 degrees.

9. The seal element as recited in claim 7, wherein the first leg portion further comprises a second generally radial surface having one end engaging the other end of the fourth angled surface, and a fifth generally angled surface having one end engaging the other end of the second radial surface of the seal element; and wherein the seal element further comprises a second leg portion including a sixth generally angled surface having one end engaging the other end of the fifth angled surface to form a generally inwardly rounded surface, a third generally radial surface having one end engaging the other end of the sixth angled surface, a seventh generally angled surface having one end engaging the other end of the third radial surface, and an eighth generally angled surface having one end engaging the other end of the seventh angled surface and the other end engaging the other end of the axial surface of the seal element, the second leg portion for extending generally in the direction of the second radial surface of the groove.

10. A seal element for installation in an annular groove having a mouth, first and second generally parallel radial surfaces, and a generally axial surface interconnecting the first and second radial surfaces, the seal element comprising a generally annular shape, formed of an elastomeric material, and having:

a body portion including a first generally radial surface for facing the first radial surface of the groove, a first generally angled surface having one end engaging the one end of the first radial surface of the seal element, and a second generally angled surface having one end engaging the other end of the first angled surface to form a high pressure sealing line, the first and second angled surfaces for facing in the direction of and partially protruding through the mouth of the groove; and a first leg portion including a third generally angled surface having one end directly engaging the other end of the second angled surface at a stress-relieving radius and a fourth generally angled surface having one end engaging the other end of the third angled surface to form a low pressure sealing line, the third and fourth angled surfaces for facing in the direction of and partially protruding through the mouth of the groove, the first leg portion for extending generally in the direction of the second radial surface of the groove;

whereby upon the application of pressure the stress-relieving radius relieves excessive tensile stress, alleviates cracking, and provides better flexing motion to the low pressure sealing line;

the body portion of the seal element further comprising a generally axial surface for facing the axial surface of the groove, the other end of the first radial surface of the seal element engaging one end of the axial surface of the seal element to form a heel portion, the seal element being initially positioned within the groove such that the first radial surface of the seal element forms an initial acute heel angle with respect to the first radial surface of the groove;

the heel angle being substantially reduced to a minimal value when an annular opposing surface is positioned across the mouth of the groove to compress the seal element toward the axial surface of the groove and when the compressed seal element is unpressurized, the axial surface of the compressed seal element substantially contacting the axial surface of the groove, the first radial surface of the compressed seal element substantially contacting the first radial surface of the groove, and the high pressure sealing line of the compressed seal element contacting the opposing surface at a first squeeze level;

the high pressure sealing line of the compressed seal element contacting the opposing surface at a second squeeze level higher than the first squeeze level when the compressed seal element is pressurized, whereby rocking of the seal element against the first radial surface of the groove during multiple cycles of unpressurization and pressurization is minimized.

11. The seal element as recited in claim 10, wherein the initial heel angle is between about 2 and about 15 degrees.

12. The seal element as recited in claim 11, wherein the first leg portion further comprises a second generally radial surface having one end engaging the other end of the fourth angled surface, and a fifth generally angled surface having one end engaging the other end of the second radial surface of the seal element; and wherein the seal element further comprises a second leg portion including a sixth generally angled surface having one end engaging the other end of the fifth angled surface to form a generally inwardly rounded surface, a third generally radial surface having one end engaging the other end of the sixth angled surface, a seventh generally angled surface having one end engaging the other end of the third radial surface, and an eighth generally angled surface having one end engaging the other end of the seventh angled surface and the other end engaging the other end of the axial surface of the seal element, the second leg portion for extending generally in the direction of the second radial surface of the groove.

* * * * *